United States Patent [19]

Russell

[11] 4,432,431

[45] Feb. 21, 1984

[54] CHANGE SPEED MULTIPLE AXLE SHIFT LOCK OUT

[75] Inventor: John D. Russell, Mentor, Ohio

[73] Assignee: Eaton Corporation, Cleveland, Ohio

[21] Appl. No.: 290,985

[22] Filed: Aug. 7, 1981

[51] Int. Cl.³ .......................... F16H 1/44; F16H 1/40
[52] U.S. Cl. .................................... 180/248; 74/710.5; 74/713
[58] Field of Search ...................... 74/710.5, 710, 711, 74/713; 180/248, 249, 250

[56] References Cited

U.S. PATENT DOCUMENTS

| | | | |
|---|---|---|---|
| 2,948,370 | 4/1956 | Winther et al. | 192/4 R |
| 3,000,456 | 9/1961 | Christie | 74/710.5 X |
| 3,146,842 | 9/1964 | Nelson et al. | 74/710.5 |
| 3,368,638 | 8/1965 | Terry et al. | 74/710.5 X |
| 3,388,760 | 12/1965 | Christie | 180/24.09 |
| 3,448,635 | 3/1967 | Nelson | 74/710.5 |
| 3,650,349 | 3/1972 | Cleveland et al. | 180/249 |
| 3,788,166 | 1/1974 | Hart et al. | 74/710.5 |
| 3,871,249 | 3/1975 | Jeffers | 74/711 |
| 4,280,583 | 7/1981 | Stieg | 180/250 |

FOREIGN PATENT DOCUMENTS

| | | | |
|---|---|---|---|
| 1353332 | 1/1964 | France | 74/711 |
| WO81/02049 | 7/1981 | PCT Int'l Appl. | 74/711 |
| 790541 | 2/1958 | United Kingdom | 74/710.5 |

Primary Examiner—Leslie A. Braun
Assistant Examiner—Stephen Andrews
Attorney, Agent, or Firm—C. H. Grace; H. D. Gordon

[57] ABSTRACT

An improved control system for a change speed multiple drive axle assembly, such as a tandem axle assembly (10), having a lockable interaxle differential (35) is provided. The improved control system (306) permits engagement and disengagement of the interaxle differential lockup in either the high or low speed ranges of the tandem axle mechanisms (11 and 12) and includes means to sense actual and/or impending engagement (96) of the interaxle differential lockup (84) to prevent operator shifting of the axle shift selector switch (150).

4 Claims, 10 Drawing Figures

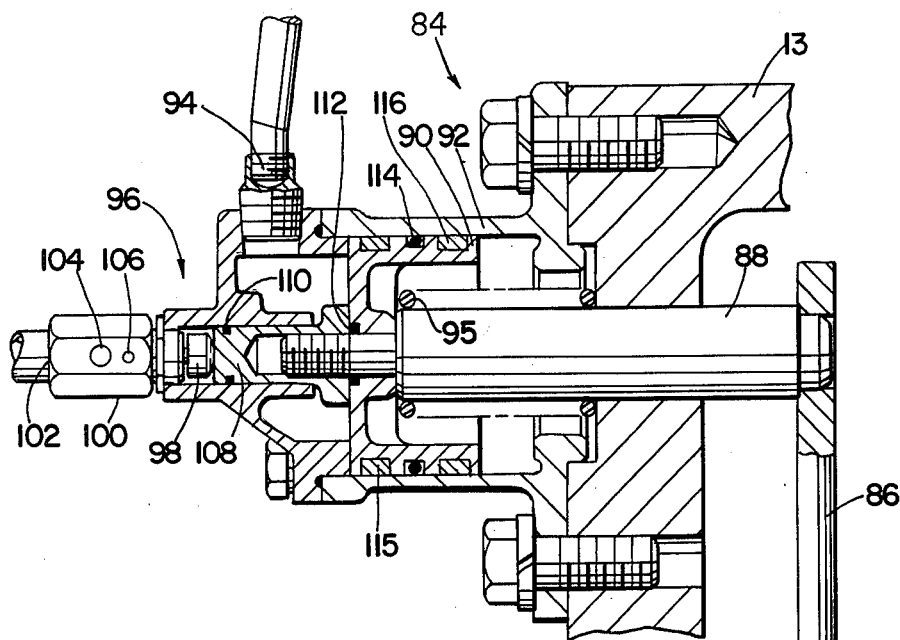
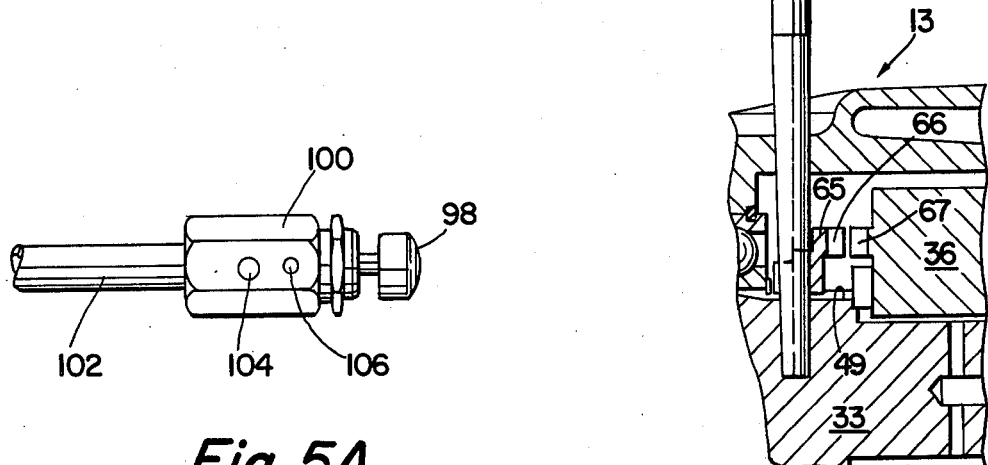
Fig. 5A
Fig. 5

CHANGE SPEED MULTIPLE AXLE SHIFT LOCK OUT

BACKGROUND OF THE INVENTION

1. Field of the Invention

The present invention relates to multispeed, selectively shiftable multiple axle assemblies such as tandem axle assemblies or 4×4 and/or 6×6 axle assemblies having a selectively lockable interaxle differential mechanism and more particularly, to multispeed multiple drive axle assemblies having interaxle differential lockups wherein engagement of the interaxle differential lockup will automatically prevent shifting of the drive axle assembly.

2. Description of the Prior Art

Multispeed, selectively shiftable drive axles, and the mechanisms and controls for selectively shifting same are well known in the prior art as may be seen by reference to U.S. Pat. Nos. 2,462,779 and 2,948,370, both hereby incorporated by reference.

Multiple drive axle assemblies, such as tandem axles, having interaxle differentials, also called power dividers, with selectively engaged interaxle differential lockups, and the mechanisms and controls for selectively locking the interaxle differentials, are well known in the prior art as may be seen by reference to U.S. Pat. Nos. 3,000,456 and 3,388,760, both hereby incorporated by reference.

Multispeed tandem axles having lockable interaxle differentials with separate controls for selectively shifting the axles and engaging the interaxle differential, and controls for limiting shifting of the axles in response to sensing engagement of the interaxle differential lockup are known in the prior art as may be seen by reference to U.S. Pat. No. 3,368,638 hereby incorporated by reference.

As is known, it is desirable to prevent shifting of a multiple axle assembly when the interaxle differential is locked up (i.e. not free to differentiate). This is because if the axles do not shift simultaneously, the individual drive axles, such as for example the front-rear axle and rear-rear axle of a tandem axle assembly, may momentarily be engaged in different speeds (i.e. different ratios) and if the interaxle differential is not free to differentiate under such conditions, damage is likely to occur.

The problem has been recognized in the past and control systems such as illustrated in above-mentioned U.S. Pat. No. 3,368,638 have been provided. However, while generally satisfactory, the prior art systems have not been totally satisfactory as such systems typically allow the interaxle differential to be engaged in only one of the selected speeds. For example, in the system illustrated in U.S. Pat. No. 3,368,638, engagement of the interaxle differential automatically vented the axle shift cylinders causing the spring biased pistons to shift all of the axles to low speed. Also, as engagement of the interaxle differential caused a shifting to low speed, and as a "torque lock" at one of the axle assemblies and/or different length air and/or hydraulic lines might cause nonsimultaneous shifting of the axles, damage could result. Additionally, as the prior art systems typically responded to an engagement of the interaxle differential by venting of the air or hydraulic actuated axle shift control mechanism, rather than by a positive lock out of the axle shift selector switch, driver abuse by preselection of an axle shift was possible.

BRIEF DESCRIPTION OF THE INVENTION

In accordance with the present invention, the drawbacks of the prior art have been minimized or eliminated by the provision of a control system for a multispeed multiple drive axle assembly having a selectively engaged interaxle differential lockup which is effective to sense engagement and impending engagement of the interaxle differential lockup and to positively lock the axle shift control lever or mechanism in its existing position thereby positively preventing operator selection of an axle shift until the interaxle differential lockup is disengaged.

The above is accomplished by providing a sensor, such as a valve for physically sensing engagement and disengagement of the interaxle differential lockup which valve is effective upon sensing actual or impending differential lockup to supply pressurized fluid to a lockout member, such as a spring biased retracted-fluid pressure extended pin, which when extended will physically interfere with movement of the operators axle shift selector switch. Of course, the system is also applicable to electrically operated controls wherein proximity switches, solenoids or the like may replace the fluid pressure system components.

Accordingly, it is an object of the present invention to provide a new and improved control system for a multispeed multiple drive axle assembly having a selectively engaged interaxle differential lockup which will permit engagement of the interaxle differential lockup in any speed wherein the drive axles are at the same ratio and which will sense engagement of the interaxle differential lockup and cause the axle shift selector switch to be locked in its existing position.

The above and other objects and advantages of the present invention will become apparent from a reading of the description of the invention taken in view of the drawings.

BRIEF DESCRIPTION OF THE DRAWINGS

FIG. 5 is a fragmentary cross-sectional view of the interaxle differential lockup mechanism of the present invention.

FIG. 5A is a separate view of the differential lockup sensing valve of FIG. 5 in its normal spring biased position.

DESCRIPTION OF THE PREFERRED EMBODIMENT

Figures 1, 2:
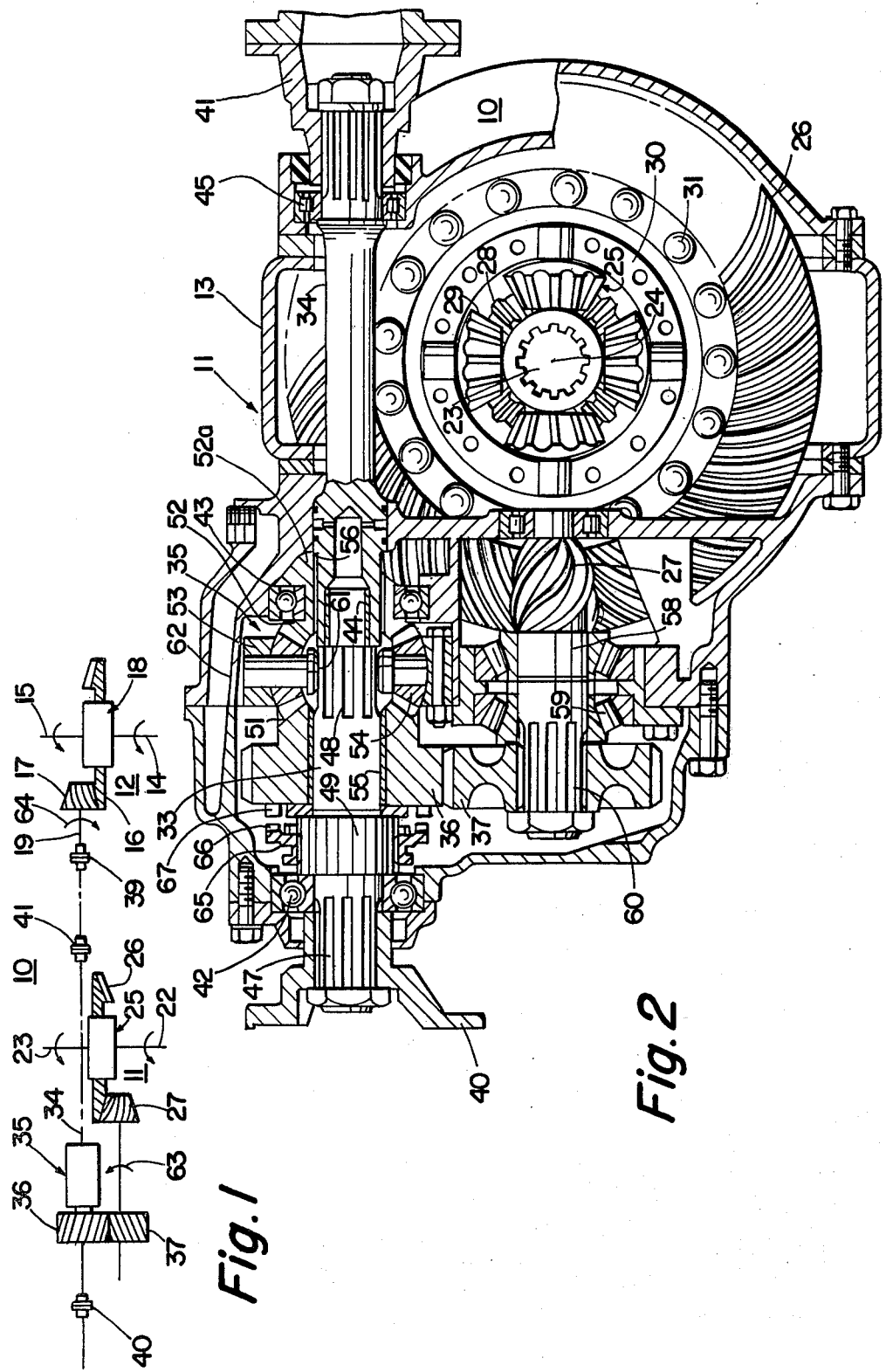
FIG. 1 is a schematic view of an automotive vehicle having a tandem axle assembly embodying the present invention.
FIG. 2 is a longitudinal vertical section of the power divider and front-rear axle of FIG. 1.

The present invention provides an improved multispeed multiple drive axle assembly and control, and more particularly, provides an improved multispeed, multiple axle drive including a pair of driving axles and an interaxle differential. Multispeed, multiple drive axle assemblies, such as tandem axle assemblies and 4×4 or 6×6 drive axle assemblies are known to include shift mechanisms for shifting each of the driving axles between high and low speeds. Such multiple driving axles are known to be connected by an interaxle differential mechanism having a differential lockup mechanism associated therewith for rendering the interaxle differential ineffective to provide a differential action between the multiple axles. Moreover, a pressurized fluid control system is associated with such axles for actuating the shift mechanisms for shifting the axles between their high and low speed positions and also for actuating the differential lockup mechanism to lock the interaxle differential. It is understood, however, that the present invention is also applicable to electrical control systems associated with such tandem axles as will be described in greater detail below.

For purposes of disclosure of the present invention, a tandem axle mechanism 10 for a vehicle which comprises a plurality of driving axles, in this instance two such axles 11 and 12 deposed in a tandem arrangement, and of which the axle 11 is the front-rear axle and the axle 12 is the rear-rear axle is shown in FIGS. 1-5. Each of the axles is provided with a suitable housing 13 for containing the mechanism by which driving torque is supplied to the traction wheels of the vehicle.

It is understood that the present invention is equally well suited for other types of multiple drive axle assemblies, such as 4×4 or 6×6 drive axle assemblies which are well known in the art.

The rear axle 12 is of a conventional two-speed axle construction throughout and need be described only to the extent of pointing out the general arrangement and main components therof. Further details of such two-speed axle assemblies may be seen by reference to U.S. Pat. Nos. 3,265,173 and 3,503,208 both of which are hereby incorporated by reference. The front axle 11 is illustrated in greater detail in FIG. 2 and will be described in greater detail herein. Further details of the front axle may be appreciated by reference to U.S. Pat. No. 3,000,456, hereby incorporated by reference.

The rear axle 12 comprises, in addition to the housing thereof, a pair of transversely aligned axle shafts 14 and 15 rotatable about a common axis, as is presented in FIG. 1, and by which driving torque is delivered to traction wheels associated with the rear axle. The rear-rear axle 12 also includes power input gearing comprising a ring gear 16 and a driving pinion 17 cooperating with the latter. Additionally, the rear-rear axle 12 comprises a differential 18 of a conventional construction and through which the driving torque is supplied to the axle shafts 14 and 15. The drive pinion 17 is connected with power input shaft means 19 which extends to the rear-rear axle 12 from the front-rear axle 11 and is located on the side of the ring gear 16 facing toward the axle shaft 15 as is represented in FIG. 1 of the drawings.

The front-rear axle 11 comprises, in addition to the housing 13, a pair of axle shafts 22 and 23 located in a transversely aligned relation and rotatable about a common rotational axis 24. The front axle 11 also includes a differential 25 of a conventional construction and by which the driving torque is delivered to the axle shafts 22 and 23 for propelling the traction wheels associated with the latter. Additionally, the front-axle 11 comprises a ring gear 26 and a drive pinion 27 in meshing engagement with the latter. The front axle 11 also includes power input shaft means comprising a pair of aligned shaft members 33 and 34 rotatable about a common rotational axis, and power input gearing comprising an interaxle differential, or power divider 35 and a gear train comprising a pair of gears 36 and 37 for transmitting the input torque from the interaxle differential to the drive pinion 27.

The shaft member 33 is provided with suitable joint or universal coupling means 40 for connection with a propeller shaft or the like and delivers input torque into the interaxle differential 35, and the shaft member 34 delivers torque from the interaxle differential to the power input shaft 19' of the rear axle 12. The rear end of the shaft member 34 is connected with the input shaft means 19 of the rear axle as by means of a suitable coupling or universal joint means 41. The input shaft means 19 may include a second coupling or universal joint means 39 as is shown in FIG. 1.

The shaft member 33 is rotatably supported in the housing 13 (see FIG. 2) by suitable anti-friction bearings 42 and 43, and the rear end of the shaft member extends into, and is rotatable in, a bushing 44 mounted in a socket portion provided in the front end of the shaft member 34. The bearing 43 also supports the front end of the shaft member 34 as well as the rear end of the interaxle differential 35. The rear end of the shaft member 34 is supported in the housing 13 by a suitable anti-friction bearing 45. The front end of the shaft member is provided with a splined portion 47 on which the coupling 40 is mounted and is also provided with other splined portions 48 and 49 for purposes which will be described hereinafter.

The interaxle differential 35 comprises a pair of side gears 51 and 52 located in a spaced apart relation along the rotational axis of the shaft member 33, a rotatable carrier 53, and a group of differential pinion gears 54 disposed in meshed engagement with the side gears and supported by the carrier. The side gears 51 and 52 constitute the power output members of the interaxle differential 35 and supply power respectively to the drive pinions 27 and 17 of the front-rear and rear-rear axles 11 and 12. The forward side gear 51 is rotatably mounted on the shaft member 33 by suitable bushings 55 and is directly connected with a gear 36 of the power input gear train of the front-rear axle in this instance by being formed integral with the latter gear. The rearmost side gear 52 includes a sleeve portion 52a which is mounted on the inner race of the bearing 43 and is drivingly connected with the shaft member 34 by a splined connection 56.

The drive pinion 27 is formed on or connected with a pinion shaft 58 which is rotatably supported in suitable anti-friction bearings 59. The forward end of the pinion shaft 58 is provided with a splined portion 60 which has a gear member 37 secured thereon.

The delivery of power into the interaxle differential 35 is accomplished by having the pinion carrier 53 splined on the intermediate portion 48 of the shaft member 33. The carrier 53 carries stub shaft spider 62 which is mounted in the body of the carrier and rotatably supports planet pinions 54 on the stub shafts thereof. The planet pinions 54 are disposed in the annular space between the tooth bevel faces of the side gears 51 and 52 and extend in a bridging or spanning relation between these gears.

The drive pinion 27 of the front-rear axle 11 is located on the right hand side of the ring gear 26 as shown in FIGS. 1 and 2, and this represents a different arrangement than the drive pinion and ring gear arrangement referred to above as being present in the rear axle 12. When the drive pinion 27 is located on the right hand side of the ring gear 26, the direction of driving rotation of the pinion will be a counterclockwise direction, as represented by the arrow 63 of FIG. 1, which is in contrast to the clockwise driving rotation of the drive pinion 17 of the rear-rear axle 12 as represented by the arrow 64.

In the front-rear axle 11, as shown in FIG. 2 of the accompanying drawings, a clutch member 65 is slidably mounted on the splined portion 49 of the shaft member 33 and is rotatably driven by the latter. The clutch member 65 is provided with clutch teeth 66 for cooperation with clutch teeth 67 provided on the gear 36. The clutch member 65 provides a locking means by which the interaxle differential 35 can be locked up when it is desirable.

Although a positive clutch type of interaxle differential lockup is illustrated, the present invention is equally applicable to frictional clutch type differential lockups.

Each of the drive axles 11 and 12 is a two-speed axle and includes a power ratio shifting mechanism for the shifting thereof between a high and low ratio, only one of which, 68 utilized in connection with rear-rear drive axle 12, is illustrated, it being understood that the shifting mechanism utilized in connection with front-rear drive axle 11 is substantially identical. The general operation of two-speed axle shift mechanisms is well known and is illustrated in the above-mentioned patents and will thus only be briefly decribed herein.

Figure 4:
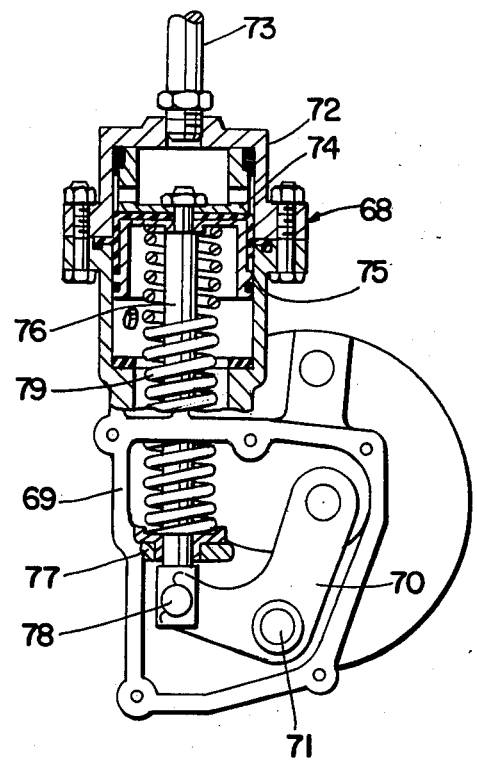
FIG. 4 is a fragmentary cross-sectional view taken approximately along the line 4—4 in FIG. 3.
Figure 3:
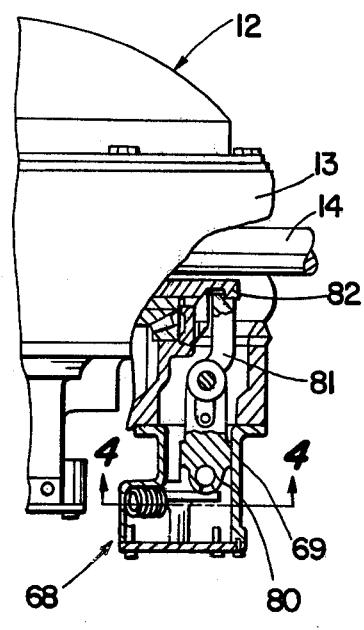
FIG. 3 is a fragmentary cross-sectional view of the rear-rear axle of FIG. 1.

The shift unit 68 (see FIGS. 4 and 5) is of any conventional construction and is preferably air operated to effect a shifting of the axle 12 to high gear and is capable of shifting the axle to low gear upon depressurization. Such shifting between high and low speeds takes place when the torque load on the axle is below a predetermined value. The shift unit 68, as shown in FIGS. 3 and 4, includes a housing 69 which is fixed to the enlarged portion of the axle 12. A generally L-shaped bell crank 70 is mounted on a substantially horizontal and central pivot 71 within the housing 69. A pressure fluid cylinder 72 extends substantially upwardly from the crank housing 69 and is connected at its upper end to a fluid conduit 73. A piston member 74 is reciprocable in the cylinder 75 and includes seal means for preventing fluid leakage therepass. A connecting rod 76 is connected to the piston 74 and extends therefrom through a fixed guide 77. The lower end of the connecting rod 76 includes a pin 78 which is pivotably and slidably received in a groove in the left end of the bell crank 70, as viewed in FIG. 4. A compression spring 79 is coaxially disposed on the connecting rod 76 between the guide 77 and piston 74 and urges the piston upwardly as viewed in FIG. 4 toward the upper end of the cylinder 75. From the above, it should be apparent that the piston 74 is biased in an upward direction by the spring 79, but when fluid pressure of a sufficient magnitude is delivered through the conduit 73 will move downwardly therein, as viewed in FIG. 4, and thereby cause pivoting movement of the bell crank 70.

The bell crank 70, when moved, effects shifting of the axle drive in a well known manner. The end of the bell crank member 70 not connected to the connecting rod 76 carries an actuator knob 80 connected with a pivoted lever member 81. The lever member 81 extends inwardly of the housing 13 and is engagable with a sleeve member, of sliding clutch gear, 82. Upon pivoting movement of the lever 81, the sliding clutch gear 82 moves axially along a shaft portion 14 of the axle 12. The movement of the sliding clutch member 82 affects a shifting of the output speed of the axle in a well known manner and, specifically, certain teeth elements on the sliding clutch gear 82 operate with teeth elements on certain portions of the axle mechanism to provide a high and low output speed of the axle in different positions of the clutch gear 82, as indicated in U.S. Pat. No. 3,146,842, hereby incorporated by reference.

The sliding clutch gear 82 is biased by a spring 79 to its low speed position and is moved to its high speed position upon actuation of the shifting mechanism caused by a fluid pressure to be delivered through the cylinder 75. Any shifting of the sliding clutch gear 82 will take place only when the torque loading on the slide member is reduced below a predetermined value. If such torque loading is above the predetermined value, the piston 74 will not move in response to pressurization in the line 73. If the torque loading is below the predetermined value, the sliding clutch gear 82 is moved to its high speed position. Moreover, upon release of the pressure above the piston member 74, the spring 79 will not move the piston member 74 vertically until the torque is below the level which may be overcome by the spring 79.

The interaxle differential lockup mechanism 84 is, like the shifting mechanism 68, actuated by a fluid pressure. As best shown in FIG. 5, the interaxle differential lockup mechanism 84 is similar to that disclosed in U.S. Pat. No. 3,146,842 and reference may be made thereto for a specific description thereof. In general, the differential lockup mechanism 84 includes a sleeve member 65 supported on the input shaft 33 which delivers power to the interaxle differential 35. The sleeve member 65 is slidable on the shaft 33 and a splined thereto and has laterally projecting teeth 66 to engage with teeth 67 on the gear 36 forming a part of the interaxle differential 35. When the teeth 66 intermesh with teeth 67 of the interaxle differential, the drive of the input shaft 33 is directed to the interaxle differential side gear 36 and renders the interaxle differential 35 inoperable to provide a differentiating action and thus the forward and rearward axles are driven at a fixed drive ratio and the interaxle differential is locked out.

The sleeve member 65 is moved between its locked out and nonlocked out positions by a connecting yoke or shift fork member 86 which is connected with the sleeve member 65 and extends outwardly therefrom. The outer end of the shift fork 86 is fixedly connected with a piston rod member 88. The piston rod member 88 at the other end thereof carries a piston member 90 which is slidable in cylinder 92. The piston member 90 is biased by a spring 95 to a position wherein the sleeve member 65 is disengaged from the interaxle differential gear 36 thereby rendering the interaxle differential 35 operable. However, upon fluid pressure being delivered to the cylinder 92, the fluid pressure will cause movement of the piston rod 88 to the right, as viewed in FIG. 5, and corresponding movement of the member 86 into a position wherein the sleeve 65 is in locking engagement with the gear 36 thereby locking out the interaxle differential. Fluid pressure is delivered to the cylinder 92 by a fluid conduit 94.

Of course, a reversed system may also be provided wherein the piston rod and piston are spring biased to a position whereat the sleeve 65 is in locking engagement with gear 36 and is displaced from that position by the application of fluid pressure to the cylinder to release the lockup.

The axle mechanism 10 of the present invention is provided with a control constructed so that the tandem drive axles 11 and 12 may only be shifted when the differential lockup mechanism 84 is disengaged. To this end, a valve mechanism, generally designated 96 is provided. Valve mechanism 96 is associated with the differential lockup mechanism 84 and is operable to sense that the interaxle differential lockup mechanism is, or is about to be, in the engaged position and to cause the axle shift selector switches to be physically locked and prevented from operator manipulation. As may be seen by reference to FIG. 5a where valve 96 is shown in its normal position, valve 96 is a spring biased normally open valve having a plunger 98 which extends from the body 100 of the valve when the valve is in its normally open position. Valve 96 is provided with an inlet 102 and an outlet 104 which are normally in an open or fluid communicating condition. Depression of plunger 98 is effective close the normally open valve 96 and to block the fluid flow from inlet 102 to outlet 104. An exhaust or vent port 106 is also provided in valve body 100 whereby pressure downstream of outlet 104 is exhausted when plunger 98 is depressed.

As may be seen by reference to FIG. 5, valve 96 is mounted in interaxle differential lockup 84 such that a piston extension rod 108, fixed for axial movement with piston 90, is effective to engage plunger 98 and to depress same into valve body 100 of valve 96 whenever the interaxle differential lockup mechanism 84 is in the nonlockup condition for sleeve 65. Accordingly, whenever sleeve 65 is in the nonlockup condition, fluid flow between inlet 102 and outlet 104 of valve 96 is blocked and outlet 104 is exhausted to port 106. However, whenever the piston rod 88 is moved rightwardly sufficient to cause actual or impending engagement of teeth 66 of sleeve 65 with teeth 67 of gear 36 to lockup the interaxle differential 35, the extension rod 108 will move rightwardly allowing the plunger 98 to extend from valve body 100 of valve 96 thereby opening fluid communication between the inlet 102 and outlet 104 of valve 96. The effect of such opening and closing of communication between inlet 102 and outlet 104 of valve 96 will be described in further detail below.

Seal 110 is provided to isolate valve 96 from cylinder 92 and seals 112 and 114 are provided to fluidly seal piston 90 and cylinder 92. A felt lubricator 115 may be provided as shown.

Figure 7:
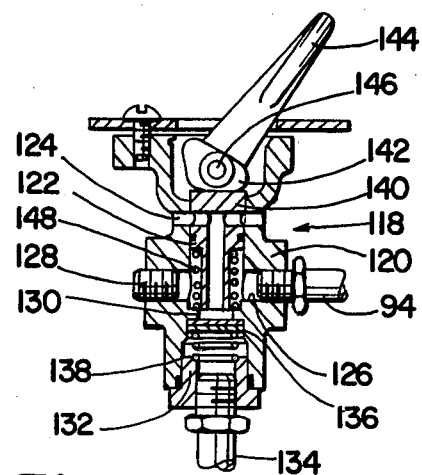
FIG. 7 is a sectional view of the interaxle differential lockup selector switch valve.

The interaxle differential lockup mechanism 84 is selectively actuated by operation of a valve 118 best seen by reference to FIG. 7. The valve 118 comprises an elongated housing 120 having a central opening 122 extending therethrough. An exhaust passageway 124 opening to the atmosphere extends preferably diametrically through the housing 120 and communicates with the central opening 122 adjacent the upper end thereof. A passage 126 extends preferably diametrically through the housing 120 and communicates with the central opening 122 at a point spaced below the exhaust passage 124. The right end of the passage 126 is connected with the conduit 94 leading to the cylinder 92 of the differential lockup mechanism 84 which in turn controls the actuation of the differential lockup collar 65. The left end of the passage 126 is closed by a suitable plug 128. An annular flange 130 extends radially into the central opening 122 below the transfer passage 126. An annular spring retainer 132 is threaded into the bottom end of the central opening 122 and lies spaced below the flange 130. The retainer 132 has a suitable fixing therein and communicates with the central opening with a supply conduit 134 which is connected with a supply tank. A valve disk 136 is disposed in the central opening 122 below the flange 130 and has a plurality of radially outwardly extending ears. A helical compression spring 138 rests on the upper face of the spring retainer 132 and extends upwardly therefrom into contact with the valve disk 136 for urging the valve disk into sealing contact with the lower face of the annular flange 130 to prevent flow from conduit 134 to the conduit 94.

An elongated plunger 140 snugly but slidably inserted into the upper end of the opening 122. The upper end of the plunger 140 engages a cam 142 on a handle member 144. The handle 144 and cam 140 are pivoted about a suitable pivot pin 146. A plunger 140 is urged into engagement with the cam 142 by a spring 148 to cause lowering of the plunger 140. In the position illustrated in FIG. 7, the valve is closed and the conduit 94 is vented to the atmosphere through plunger 140 and the passage 124. If the valve is actuated by movement of the handle 144, the member 136 is moved away from the flange 130 and downwardly causing the conduit 134 and 94 to communicate and also at the same time preventing venting of the passage 94 to the atmosphere to passage 124. Accordingly, to engage the differential lockup 84, the handle of valve 118 is moved from the position shown by a leftward pivotal motion opening communication from supply line 134 to pressure line 94 and closing line 94 to atmosphere causing pressurized fluid to be introduced into cylinder 92 thereby causing a rightward movement of piston 90 and a corresponding rightward movement of shift fork 86 and lockout sleeve 65, as seen in FIG. 5, to lock up the interaxle differential 35. Such action will, also, result in valve 96 opening communication between inlet 102 and outlet 104.

Figure 8:
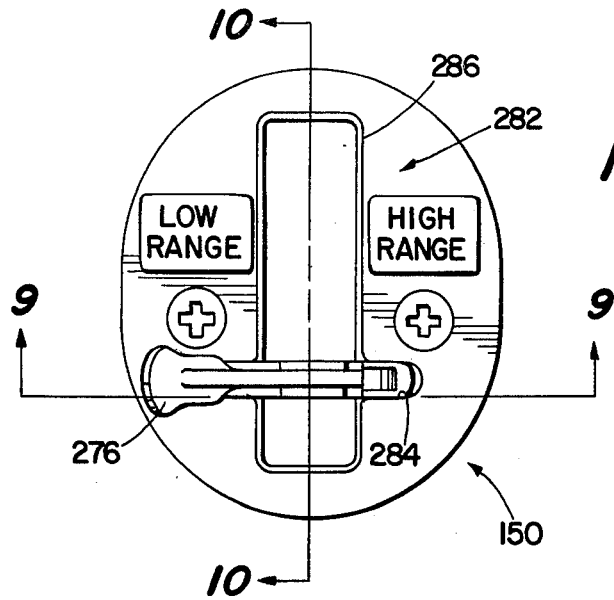
FIG. 8 is a top view of the axle shift selector valve.
Figure 10:
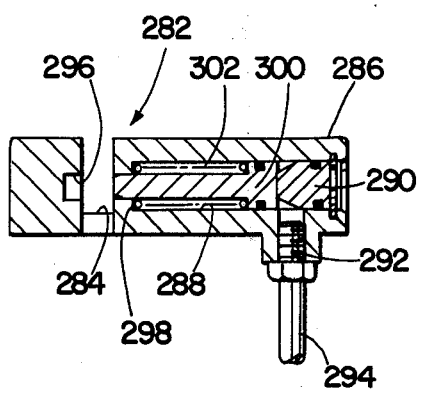
FIG. 10 is a top sectional view of a portion of the selector valve of FIG. 8 taken approximately along line 10—10 in FIG. 8.
Figure 9:
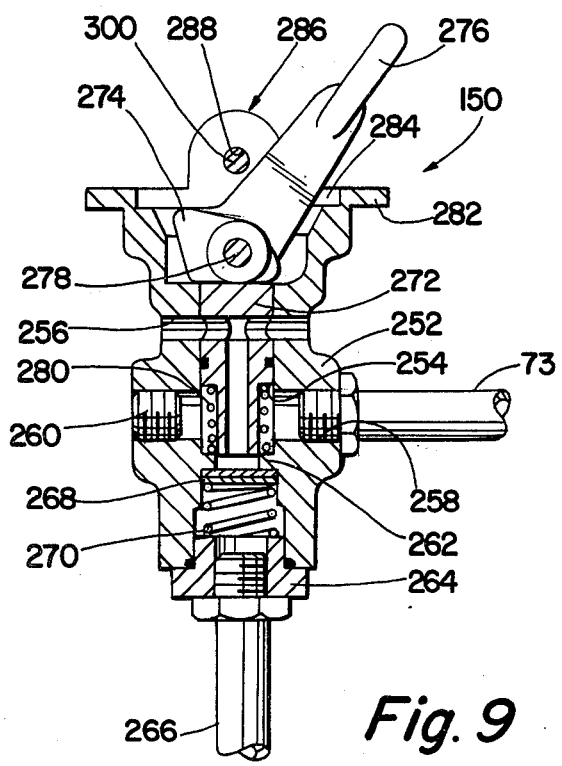
FIG. 9 is a sectional view of the axle shift selector valve taken approximately along line 9—9 in FIG. 8.

The axle shift selector valve 150 may be seen by reference to FIGS. 8-10. The axle shift selector valve 150 is similar to the differential lockout selector valve 118 described above. The valve 150 comprises an elongated housing 252 having a central opening 254 extending therethrough. An exhaust passageway 256 open to the atmosphere extends preferably diametrically through the housing 252 and communicates with the central opening for bore 254 adjacent to the upper end thereof. The passage 258 extends preferably diametrically through the housing 252 and communicates with the central opening 254 at a point spaced below the exhaust passageway 256. The right end of the passage 258 is connected with the conduit 73 leading to the valve 68 which, in turn, controls the actuation of the axle shift mechanism for the front and rear drive axles. The left end of passage 258 is closed by a suitable plug 260. An annular flange 262 extends radially into the central opening 254 below the transfer passageway 258. An annular spring retainer 264 is threaded into the bottom end of the central opening 254 and lies spaced below the flange 262. The retainer 264 has a suitable fitting therein and communicates the central opening 254 with a supply conduit 266 which is connected with the supply tank of the vehicle pressurized air system. A valve disk 268 is disposed in the central opening 254 below the flange 262 and has a plurality of outwardly extending ears. A helical compression spring 270 rests on the upper face of the spring retainer 264 and extends upwardly therefrom into contact with the valve disk 268 for urging the valve disk 268 into sealing contact with the lower face of the annular flange 262 to prevent flow of fluid from conduit 266 to the conduit 73.

An elongated plunger 272 is snugly but slidably inserted into the upper end of the opening 254. The upper end of the plunger 272 engages a cam 274 on a handle member 276. The handle 276 and cam 274 are pivoted about a suitable pivot pin 278. The plunger 272 is urged into engagement with the cam 274 by a spring 280 located in the central opening 254 of valve. The valve 150 may be opened and closed by moving the handle 276 to cause lowering of the plunger 272. In the position illustrated in FIG. 9, the valve is closed and conduits 73 and 266 are not communicating and the conduit 73 is vented to the atmosphere through plunger 272 and passage 256. If the valve is actuated by movement of the handle 276 to the position illustrated in FIG. 8, a valve disk 268 is moved away from the flange 262 and downwardly causing the conduit 73 and 266 to communicate and also, at the same time, preventing venting of the conduit 73 to the atmosphere through the passage 256. Under these conditions, pressurized fluid will be supplied from passage 266 through valve 150 and into passage 73 which will cause pressurization of cylinder 72 of valve 68 to shift the front and rear drive axles to a high speed position.

Valve 150 includes a coverplate and lockout mechanism assembly 282. As may be seen by reference to the drawings, the handle 276 is pivotable in a slot 284 provided in the coverplate assembly. Coverplate assembly 282 includes a raised boss 286 defining a bore 288 generally normal to and intersecting the slot 284. Bore 288 is sealed by plug member 290 and includes a supply bore or inlet 292 intersecting the bore 288 adjacent its rightward end. The bore 292 is provided with a suitable fitting for connection to line 294 which is in fluid communication with the outlet 104 of valve 96. Bore 288 defines a reduced diameter section 296 at an internal shoulder 298. A piston 300 is slidably and sealingly received in the enlarged diameter portion of bore 288 and is spring biased by a compression spring 302 extending from the shoulder 298 to an enlarged diameter portion of piston 300 to the position shown in FIG. 10. Pressurization of line 294 will result in piston 300 moving to the left against the bias of spring 302 to intersect the slot 284 and thus prevent pivotal movement of handle member 276 of valve 150. As line 294 will be pressurized whenever the differential lockout mechanism is engaged, or if engagement of the lockup mechanism is impending, the piston 300 will be extended to its leftward most position whenever the interaxle differential lockout mechanism is in engaged and thus positively prevent operator selected axle shifts by preventing pivotal movement of handle 276 of valve 150.

Figure 6:
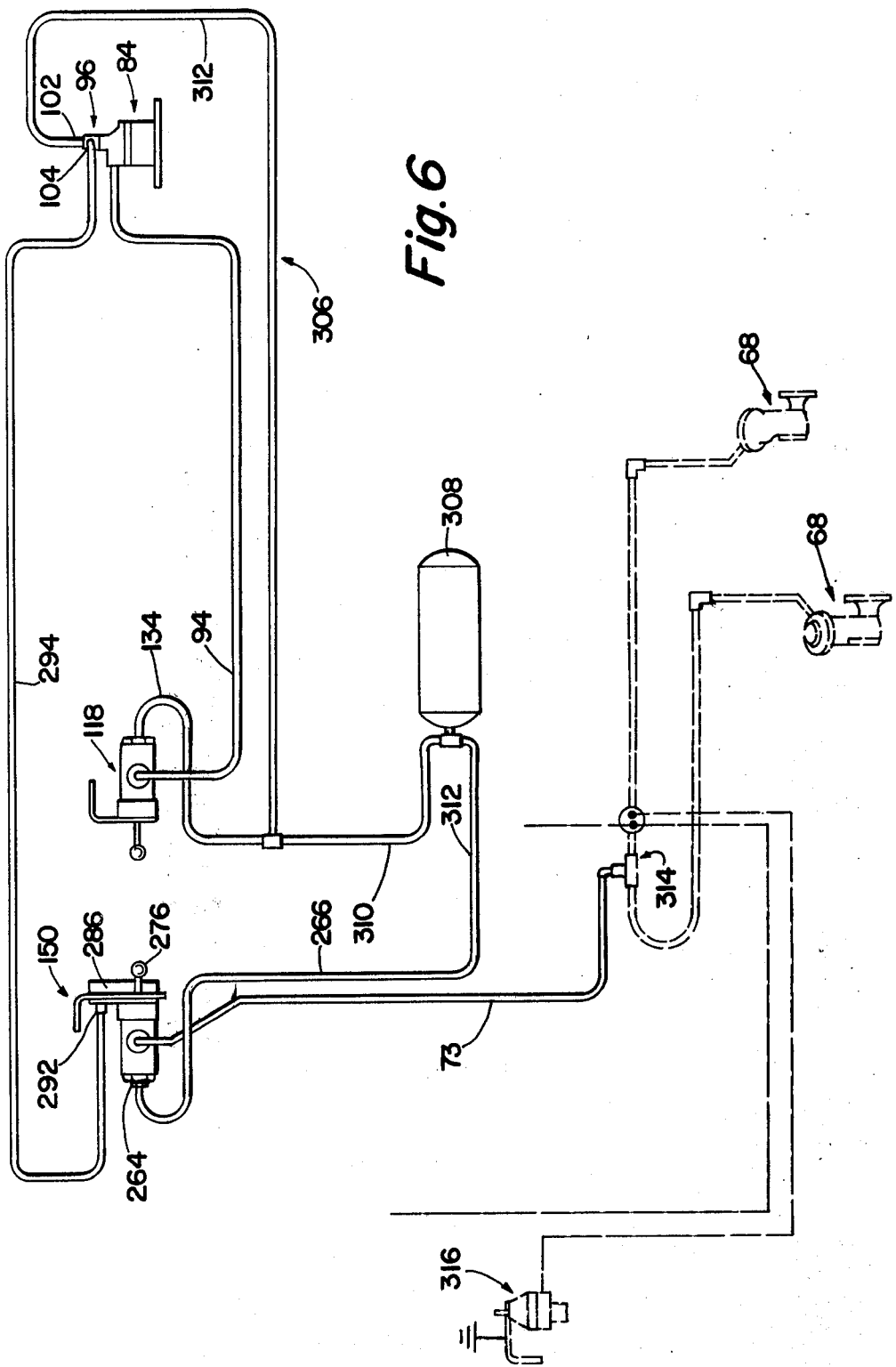
FIG. 6 is a circuit diagram of the control for the tandem axle assembly of FIG. 1.

The axle shifting and interaxle differential lockup control system of the present invention may be schematically seen by reference to FIG. 6. The control system 306 includes a pressurized fluid supply tank 308 which is normally associated with the vehicle's air system. A supply conduit 310 extends from the supply tank 308 and is connected to the inlet 102 of valve 96 via conduit 312 and also to the inlet of interaxle differential lockout selector valve 118 via inlet conduit 134. Conduit 94 extends from the interaxle differential lockout selector valve 118 to the valve 84. Conduit 294 extends from the outlet 104 of valve 96 to the inlet 292 of bore 288 in the boss 286 of the axle shift selector valve 150.

The supply tank 308 is also connected via conduit 312 to the inlet 264 of the axle shift selector valve 150 via conduit 266. Outlet conduit 73 of axle shift selector valve 150 is attached to the axle shifting mechanisms 68 for both the front-rear and rear-rear drive axle shift units 68.

A quick release valve 314 may be provided in line 73 for rapid venting of the axle shift mechanisms 68 if required. A speedometer adapter 316 may be provided which will sense the position of axle shift mechanisms 68 to properly adapt the vehicle speedometer in the event a transmission output shaft, or the like, speedometer adapter is utilized.

The control system 306 for the change speed tandem axle mechanism having an interaxle differential lockup permits selective actuation via selector valve 118 of the interaxle differential lockout mechanism 84 in either the high or low speed ranges of the tandem axles. However, upon actuation of the interaxle differential lockup mechanism 84 operator manipulation of the handle 276 of the axle shift selector valve 150 is positively prevented by the piston member 300 slidably received in boss 286. From the above description it should be apparent that applicant has provided a new and improved change speed multiple drive tandem axle mechanism having a selectively actuated interaxle differential lockout mechanism, and controls therefor. It should also be apparent that certain modifications, changes and adaptations may be made in the structure of the preferred embodiment thereof and that it is hereby intended to cover all such modifications, adaptations and constructions which fall within the spirit and the scope of the invention as hereinafter claimed.

I claim:

1. An improved control system for a change speed multiple drive axle assembly comprising at least two driving axles, each of said driving axles including a change speed mechanism acuatable to vary the output speed of the axle to a high speed and a low speed range, axle assembly speed shift selector means associated with each of said change speed mechanisms and operable by movement between a first and a second position to selectively actuate said change speed mechanisms to vary the output speed of the driving axles substantially simultaneously, interaxle differential means drivingly connected between said driving axles and operable to provide a differential action therebetween, an interaxle differential lockup mechanism actuatable to render said interaxle differential inoperative, and interaxle differential lockup selector means operable to selectively actuate said interaxle differential lockup mechanism, the improvement comprising:

said interaxle differential lockup selector means effective to engage said interaxle differential lockup mechanism in both the high speed and low speed ranges of said driving axles and sensing means associated with said interaxle differential lockup mechanism effective to sense actual and impending engagement of said lockup mechanism, said sensing means effective to provide a signal to said axle shift selector means and shift lockout means associated with said axle shift selector means to positively prevent movement of said axle shift selector means between said first and second positions thereof whenever said sensing means signal indicates actual and impending engagement of said interaxle differential lockup mechanism, said shift selector means comprising a switch housing having a handle pivotably mounted therein, said handle pivotably movable to a first and a second position relative to said housing for operation of said axle change speed mechanisms and said shift lockout means comprising a member having a first position relative to said housing allowing pivotal movement of said handle and a second position relative to said housing for blocking pivotal movement of said handle.

2. The improved control of claim 1 wherein said switch housing defines a bore generally parallel to the pivotal axis of said selector switch handle means and offset therefrom, said bore intersecting the pivotal path of said handle means, and said member comprises a spring biased pin member slidably received in said bore, said pin member adapted to overcome said spring bias and to move axially in said bore to a position whereat said pin member will intersect the pivot path of said handle upon receiving said signal from said sensing means.

3. The improved control of claim 2, wherein said sensing means comprises a valve having an inlet connected to a source of pressurized fluid and an outlet, said outlet fluidly connected to said bore, said valve blocking fluid communication between said inlet and said outlet when said interaxle differential lockup is not engaged and opening fluid communication between said inlet and said outlet when said interaxle differential lockup is moving towards or is in the engaged position, said signal comprising pressurized fluid in said outlet sufficient to cause movement of said pin member against said spring bias.

4. The improved control of claim 1, wherein shift lockout means additionally comprises a bore in said housing substantially parallel to the pivot axis of said handle and offset therefrom, said member comprising a pin member slidably and sealingly received in said bore, a biasing means for biasing said pin member to one of the first and second positions thereof and urging means activated by said signal for urging said pin member to move against said biasing means to the other of the first and second positions thereof.

* * * * *